July 10, 1962

E. B. LEACH 3,043,469

DEVICE FOR PROVIDING A SEAL FOR A HOLLOW
BODY CONTAINING A PRESSURISED FLUID

Filed June 9, 1960

2 Sheets-Sheet 1

Inventor
E. B. Leach

July 10, 1962   E. B. LEACH   3,043,469
DEVICE FOR PROVIDING A SEAL FOR A HOLLOW
BODY CONTAINING A PRESSURISED FLUID
Filed June 9, 1960   2 Sheets-Sheet 2

Inventor
E. B. Leach

United States Patent Office 3,043,469
Patented July 10, 1962

3,043,469
DEVICE FOR PROVIDING A SEAL FOR A HOLLOW BODY CONTAINING A PRESSURIZED FLUID
Edward Blackwell Leach, Compton, England, assignor to Audley Engineering Company Limited, Newport, England
Filed June 9, 1960, Ser. No. 35,025
Claims priority, application Great Britain June 26, 1959
2 Claims. (Cl. 220—46)

This invention relates to means for providing a seal for a hollow body containing a pressurized fluid. The hollow body may be in the form of part of a pipe-line or a valve for a pipe-line or alternatively the hollow body may be in the form of a pressure vessel having a removable lid or cover which is required to be sealable relative to the pressure vessel.

The object of the present invention is to provide a new or improved arrangement in which the required seal-forces are developed by the pressurized fluid itself.

Means in accordance with the present invention comprise a closure member movable relative to the body between open and closed positions, a seating member mounted on the high pressure side of the closure member for movement between the body and the closure member, at least one sealing element for forming a seal between the seating member and the closure member and at least one sealing element for forming a seal between the seating member and the hollow body, the area of the end face of the seating member adjacent to the co-acting seat being less than the area of the opposite end face of the seating member which is exposed, in use, to high pressure, means being also provided for moving said seating member away from its seat against the sealing force provided by the differential pressures acting on the two end faces of the seating member before the closure member is moved.

The or each sealing element between the seating member and the closure member may be of an expandible nature so that it can be expanded by the high pressure fluid when it is required to effect a seal. The or each sealing element between the seating member and the hollow body may be expandible in a similar manner or it may be in the form of a conventional sealing ring of O section.

Preferably, the means provided for moving the seating member away from its seat against the sealing force provided by the differential pressures acting on its two end faces would be hydraulically operated.

Figure 1:
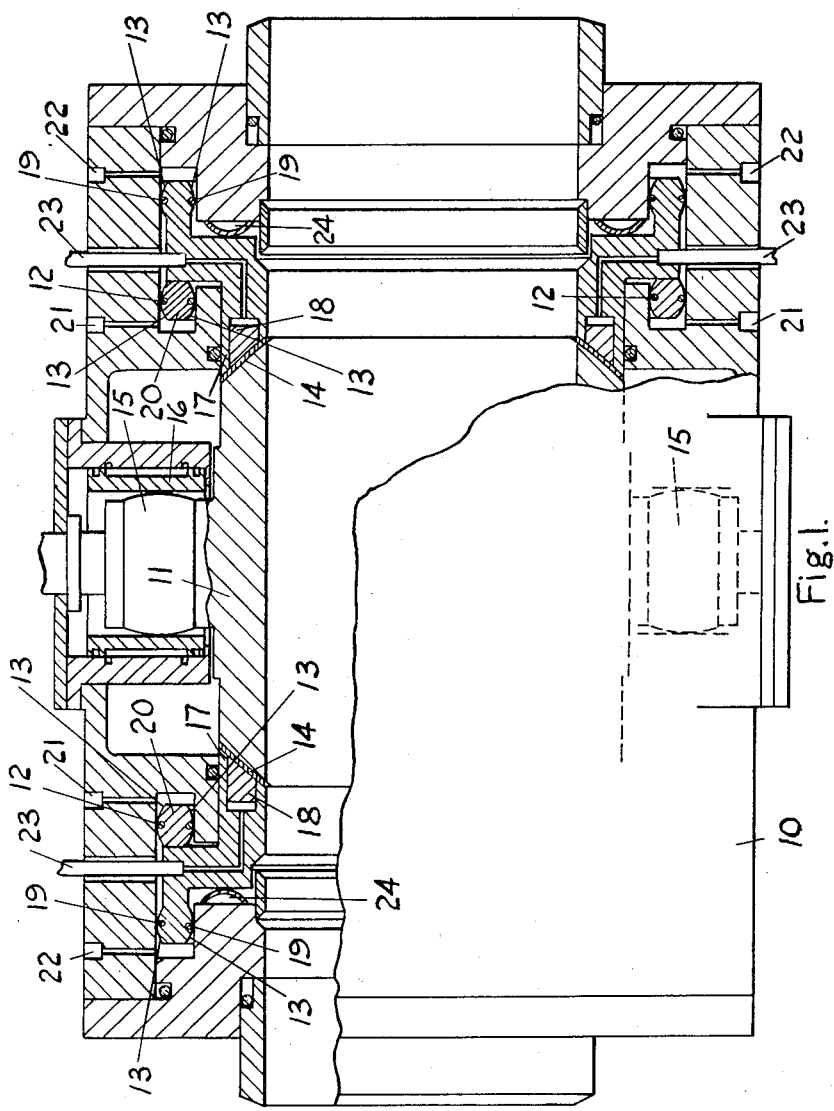
Figure 2:
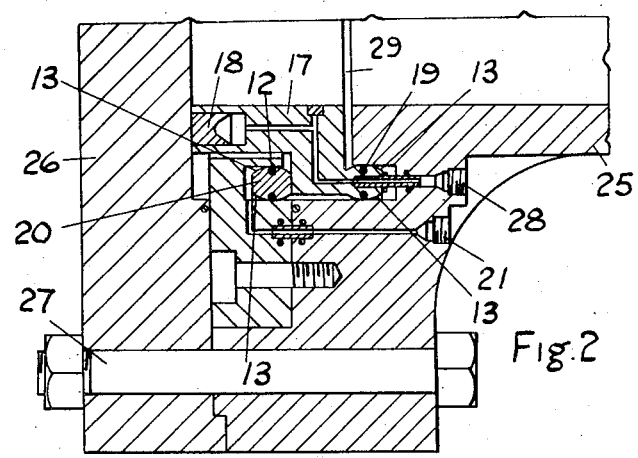
Figure 3:
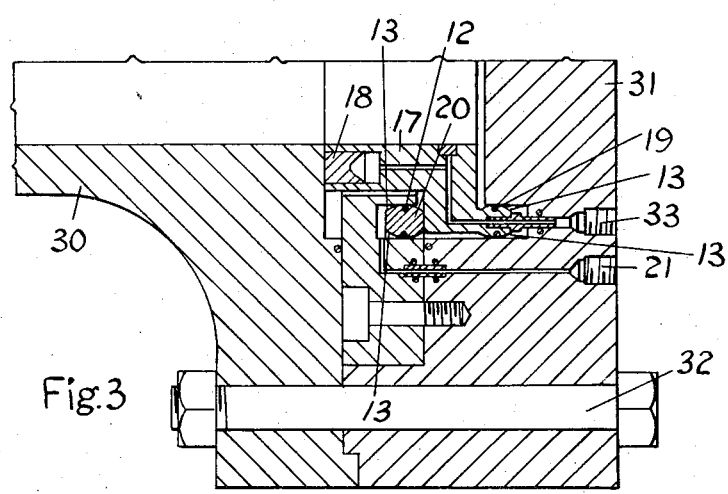

The invention is now more particularly described with reference to the accompanying drawings wherein:

FIGURE 1 is a part-sectional elevation showing a valve embodying means constructed in accordance with the present invention, FIGURE 2 is a fragmentary sectional elevation showing part of a pressure vessel embodying means in accordance with the present invention and FIGURE 3 is a fragmentary sectional elevation showing an alternative construction of pressure vessel embodying means in accordance with the invention.

Referring firstly to FIGURE 1 there is shown a valve for use in conjunction with a pipe-line, said valve including a body 10 and a closure member 11 which is of a hollow ball-like construction engaging at each end with an annular part-spherical seat as indicated by reference numeral 14. The closure member 11 is provided on either side with a projecting trunnion 15 which is disposed within a bearing generally indicated by reference numeral 16, the arrangement being that said closure member can be rotated about said trunnions for the purpose of opening or closing the valve. In the position shown in FIGURE 1 the closure member is in the open position.

There is also provided at each end of the valve a seating member 17 and an annular sealing element 18 is mounted in a groove in the end face of the seating member 17 adjacent the closure member 11. There are also provided sealing elements 19 between the seating member and the valve body.

An annular piston 20 is mounted at one end of the seating member and a connection 21 can be used to admit fluid pressure to one side of said annular piston 20 in order to move the seating member 17 in a direction away from the closure member. The seating member 17 can be moved in the opposite direction by means of fluid pressure admitted through a connection 22. A further connection 23 is used for admitting fluid pressure to the rear of the sealing element 18 in order to effect a seal against the adjacent face of the closure member. The piston 20 is provided with seals 12 and said piston 20 and the seating member 17 are each formed with convex surfaces indicated by reference numeral 13. Said convex surfaces permit a small degree of angular movement of the piston or seating member so that sealing engagement will be maintained even though there is a slight misalignment of the various parts.

As will be seen from FIGURE 1 when the seating member 17 is in sealing engagement with the closure member an annular gap is presented between the seating member and the valve body, said annular gap being indicated by reference numeral 24. The arrangement is such that the area of the surface of the seating member forming one side of said gap 24 is greater than the area of the end face of said seating member adjacent the closure member. This means that high pressure fluid entering the valve when the closure member is in the closed position will exert a force on the seating member towards the closure member, thereby effecting a seal without the provision of any external pressure. The valve shown in FIGURE 1 is provided with a seating member at each of its two ends but it is to be understood that the operative seating member will be the one on the high pressure side of the closure member.

When it is desired to move the seating member away from the closure member pressure behind the sealing element 18 would be relieved by exhausting the fluid pressure from the connection 23 and pressure may then be applied from an external source through the connection 21 to move the annular piston 20 in a direction for unseating the seating member 17. The closure member can then be rotated to a new position and the sealing element 18 moved back into sealing engagement by applying fluid pressure through the connection 23.

Referring now to FIGURE 2 the invention is shown applied to a pressure vessel wherein 25 refers to the shell of the vessel and 26 to a cover or lid forming a closure member. The closure member 26 is connected to the shell of the vessel by means of bolts 27 and in this case the seating member 17 is mounted in a flange of the shell 25. An annular piston 20 is provided as before as are sealing elements 12, 18 and 19. The connection 21 leads to one side of the annular piston as before whereas the connection 28 is used for supplying fluid pressure to the sealing element 18 and another tapping (not shown) is provided for supplying fluid pressure to the end face of the seating member 17 remote from the closure member 26. The piston 20 and seating member 17 are also provided with convex surfaces 13 as before.

As will be seen from FIGURE 2 when the seating member 17 is in the sealing position there is again afforded an annular gap 29 between the shell of the pressure vessel and one end of the seating member and the arrangement is such that the surface of the seating member forming one side of such annular gap 29 and which is exposed to the high pressure within the pressure vessel has an area which is greater than the area of the face of the seating member which is in sealing engagement with the closure member 26. Said seating member 17 will thus be maintained in sealing engagement with the closure member by virtue of the high pressure within the pressure vessel so that the provision of any external hydraulic or other fluid pressure for maintaining the seal is rendered unnecessary.

In the embodiments shown in FIGURE 3 the shell of a pressure vessel is indicated by reference numeral 30 and the lid or cover forming the closure member by reference numeral 31, the two parts being connected together by means of bolts 32. In this case the seating member 17 is carried by the closure member 31 but otherwise the construction and operation of the sealing means is as described with reference to the embodiments shown in FIGURES 1 and 2, a sealing element 18, sealing elements 19, and annular piston 20 being provided as before. The fluid pressure is applied to the annular piston to move the seating member 17 away from its seat through the connection 21 whereas fluid may be applied to the sealing element 18 through the connection 33 and through another tapping to one end of the seating member to move it towards its seat.

Thus in all the above described embodiments it will be understood that the sealing force between the seating member and the closure member is applied by the pressure of fluid inside the hollow body, so that the higher the pressure the stronger will be the sealing force, it being necessary to apply external fluid pressure only when it is desired to move the seating member prior to changing the position of the closure member.

Having thus described my invention what I claim as new and desire to secure by Letters Patent is:

1. Means for providing a seal between a hollow body for containing fluid under pressure and a closure member attached to the hollow body, comprising in combination with the hollow body and closure member, at least one annular member mounted between, and capable of a limited amount of axial movement relative to, parts of the hollow body and closure member, a first sealing member which is carried by one end of the annular member for effecting a seal between the adjacent end face of the annular member and one of the said parts of the hollow body and closure member when the annular member occupies a normal position, and which has the form of a ring mounted in a complementary groove in the corresponding end of the annular member, the groove being provided with at least one inlet through which fluid under pressure is admissible to the groove for acting on the sealing ring, and the opposite end face of the annular member having an area which is larger than that of the first mentioned end face of the annular member, and which, when the annular member occupies its normal extreme position, is exposed to the fluid pressure within the hollow body, at least one other sealing element forming a seal between the annular member and the other of the said parts of the hollow body and closure member, and fluid-operable means through the medium of which the annular member is axially movable out of its normal extreme position.

2. Means for providing a seal between a hollow body for containing fluid under pressure and a closure member attached to the hollow body, comprising in combination with the hollow body and closure member, at least one annular member mounted between, and capable of a limited amount of axial movement relative to, parts of the hollow body and closure member, a first sealing element carried by one end of the annular member for effecting a seal between the adjacent end face of the annular member and one of the said parts of the hollow body and closure member when the annular member occupies a normal extreme position, the opposite end face of the annular member having an area which is larger than that of the first mentioned end face of the annular member, and which, when the annular member occupies its normal extreme position, is exposed to the fluid pressure within the hollow body, at least one other sealing element forming a seal between the annular member and the other of the said parts of the hollow body and closure member, and fluid-operable means through the medium of which the annular member is axially movable out of its normal extreme position, and which comprises an annular piston, the latter and a part of the said annular member being each formed with convex peripheral surfaces in sealing contact with cylindrical surfaces of one of the components formed by the hollow body and closure member.

References Cited in the file of this patent

UNITED STATES PATENTS

| | | |
|---|---|---|
| 2,675,939 | Fraser | Apr. 20, 1954 |
| 2,692,066 | Conrad | Oct. 19, 1954 |
| 2,722,337 | Lindsey | Nov. 1, 1955 |
| 2,738,095 | Carter | Mar. 13, 1956 |
| 2,822,109 | Tangard | Feb. 4, 1958 |